United States Patent [19]

Price, Jr.

[11] Patent Number: 5,132,852

[45] Date of Patent: Jul. 21, 1992

[54] READ/WRITE PREAMPLIFIER WITH HEAD ISOLATION

[75] Inventor: John J. Price, Jr., Edina, Minn.

[73] Assignee: VTC Bipolar Corporation, Bloomington, Minn.

[21] Appl. No.: 545,993

[22] Filed: Jun. 28, 1990

[51] Int. Cl.$^5$ ............................. G22B 5/09; G22B 5/02
[52] U.S. Cl. ........................................... 360/46; 360/68
[58] Field of Search ............................. 360/46, 67, 68

[56] References Cited

U.S. PATENT DOCUMENTS

| | | | |
|---|---|---|---|
| 4,249,219 | 2/1981 | Choi et al. | 360/46 |
| 4,357,637 | 11/1982 | Gilbert | 360/65 |
| 4,639,794 | 1/1987 | Ferrier | 360/68 |
| 4,688,112 | 8/1987 | Shoji et al. | 360/60 |
| 4,737,867 | 4/1988 | Ishikawa et al. | 360/69 |
| 4,816,934 | 3/1989 | Tsuyuguchi | 360/62 |

Primary Examiner—Aristotelis Psitos
Assistant Examiner—Won Tae C. Kim
Attorney, Agent, or Firm—Kinney & Lange

[57] ABSTRACT

A read/write preamplifier configured for interconnection with a magnetic head through head contacts. The preamplifier includes a write control switching circuit electrically connected between first and second supply terminals and connected to the head contacts, for controlling current flow through the magnetic head. The switching circuit includes at least one transistor. A first PNP-type transistor is connected between the first supply terminal and the at least one transistor of the write control switching circuit, for controlling current flow to the write control switching circuit so as to cause the switching circuit to be driven between selected and unselected states. A PNP-type transistor bias circuit includes a mode-controlled current sink coupled between the first and second supply terminals and to the first PNP-type transistor. The bias circuit causes the first PNP-type transistor to conduct current and drive the switching circuit to the selected state when the mode-controlled current sink is active, and causes the first PNP-type transistor to prohibit current flow and drive the switching circuit to the unselected state when the mode-controlled current sink is inactive.

30 Claims, 2 Drawing Sheets

READ/WRITE PREAMPLIFIER WITH HEAD ISOLATION

BACKGROUND OF THE INVENTION

The present invention relates to read/write circuitry of a magnetic storage system. In particular, the present invention relates to a low-power read/write preamplifier configured for interconnection with a magnetic head in the magnetic storage system.

Magnetic storage systems store information by magnetizing adjacent bit positions on a recording surface of a magnetic media, such as a magnetic disk in a magnetic disk drive. Within the magnetic disk drive, an actuator arm supports a magnetic head close to the disk surface for reading and writing information to the disk surface. In larger storage systems, disk drives include several disks stacked upon one another. An actuator assembly supports several actuator arms. Each arm supports a magnetic head near the recording surface of its respective disk.

The magnetic head includes an inductive coil which reads and writes information by sensing or creating a changing magnetic field. For example, in write mode, the magnetic head writes information by forcing a relatively large current through the inductive coil in a selected direction to polarize a bit position adjacent the magnetic head in the selected direction. By controlling the direction at which adjacent bit positions are polarized, digital information may be written onto the disk surface.

In read mode, the inductive coil senses changes in polarization of adjacent bit positions. The changes in polarization induce a current in the inductive coil in a direction indicative of the direction at which the adjacent bit positions are polarized. The direction of the induced current is therefore representative of the data stored on the disk.

A read/write preamplifier controls read and write operations of the magnetic heads. The preamplifier includes one head cell circuit for each magnetic head. The head cell circuits are connected together in parallel to the rest of the read/write preamplifier circuitry. Each head cell circuit includes both read circuitry and write circuitry connected to an inductive coil. The read circuitry monitors or senses the direction of current flow induced in the inductive coil during read mode. The write circuitry controls the direction of current flow through the inductive coil during write mode.

During read mode, the read circuitry monitors the direction of current flow induced in the inductive coil at the head contacts. The read circuitry typically includes a read differential transistor pair, connected between a read current sink and a read amplifier. Each transistor in the pair includes a control terminal connected to the head contacts. Differential voltages at the head contacts are indicative of the direction of induced current through the inductive coil. These differential voltages drive the transistors in the read differential transistor pair between ON and OFF states. Current flow through the read pair is therefore representative of the data stored on the disk surface.

During write mode, the write control circuitry forces a relatively large current through the inductive coil which creates a magnetic field that polarizes the adjacent bit position on the disk surface. The write control circuitry controls the direction at which current flows through the inductive coil to polarize the bit position adjacent the inductive coil in either a first direction or in a second direction, opposite the first direction.

The write control circuitry typically includes an H-switch used to control the direction of current flow through the coil. The H-switch includes upper write switching transistors and lower write switching transistors. The upper write switching transistors are connected between a first supply rail and the head contacts. The lower write switching transistors are connected between the head contacts and a second supply rail through a write current sink. The write control circuitry controls the direction of current flow through the inductive coil by driving selected transistors in the H-switch between ON and OFF states. The write control circuitry applies a maximum voltage swing across the head contacts for reversing current flow and polarizing the adjacent bit position.

Only a single head is selected at a given time. Because the read circuitry for all heads are connected in parallel, extraneous signals from any head cell write control circuitry can corrupt the read signals. Therefore, the head cell circuitry of the unselected heads is powered down by selection circuitry to prevent unwanted signals from being written to or read from the magnetic disk. The read circuitry is powered down during write mode by removing the read current sink. The write control circuitry is powered down during read mode by removing the drive for the control terminals of the upper write switching transistors and by inactivating the write current sink. The drive for the upper write switching transistors is removed through a voltage bias circuit which biases the control terminals of the upper write switching transistors. This effectively creates a high impedance connection between the write control H-switch and the head contacts, thereby isolating the write control circuitry from the magnetic head and from the read circuitry. This allows the H-switch transistors to float to a lower voltage level at the head contacts, preventing interference with the relatively small read signals.

The voltage bias circuitry for one known Hswitch includes an NPN-type transistor for controlling drive current into the control terminals of the upper write switching transistors. A mode controlled current sink is connected to a control terminal of the NPN-type transistor. When the mode controlled current sink is active (during the unselected states and read mode), it pulls a relatively large current through a bias resistor to pull the control terminal to a LOW state to switch the NPN-type transistor into an OFF state. When the mode controlled current sink is inactive (during the selected state and write mode), the bias resistor pulls the control terminal of the NPN-type transistor to a HIGH state causing the NPN-type transistor to turn ON and conduct current. In the ON state, the NPN-type transistor supplies drive current to the control terminals of the upper write switching transistors. In the OFF state, the NPN-type transistor removes drive current from the upper write switching transistors causing the transistors to form high impedance connections with the head contacts.

In large storage systems, with ten heads for example, considerable power is dissipated in the nine unselected heads for removing the drive to the upper write switching transistors. Power dissipation is a critical design concern for circuits of this type, particularly for applications with extremely low power requirements. Therefore, a read/write preamplifier having a biasing circuit that removes drive current from the upper write switching transistors with minimal power is desired.

SUMMARY OF THE INVENTION

The present invention is a read/write preamplifier that may be driven to an unselected state with minimal power. The read/write preamplifier is configured for interconnection with a magnetic head through head contacts. The preamplifier includes a write control switching circuit electrically connected between first and second supply terminals and connected to the head contacts, for controlling current flow through the magnetic head. The switching circuit includes at least one transistor. A first PNP-type transistor is connected between the first supply terminal and the at least one transistor of the write control switching circuit, for controlling current flow to the write control switching circuit so as to cause the switching circuit to be driven between the selected and unselected states.

A PNP-type transistor bias circuit, with a mode-controlled current sink, is coupled between the first and second supply terminals and to the first PNP-type transistor. The bias circuit causes the first PNP-type transistor to conduct current and drive the switching circuit to the selected state when the mode controlled current sink is active, and causes the first PNP-type transistor to prohibit current flow and drive the switching circuit to the unselected state when the current sink is inactive.

In one embodiment, the read/write preamplifier further includes a read differential transistor pair having control terminals connected to the head contacts. The write control switching circuit further includes an H-switch having upper and lower write switching transistors, and a write data control circuit. The upper and lower write switching transistors are electrically connected to the head contacts. The upper and lower write switching transistors include control terminals which are electrically connected to the write data control circuit. The write data control circuitry operates the upper and lower write switching transistors to control the direction at which current flows through the connected magnetic head.

The first PNP-type transistor includes first and second terminals which are electrically connected between the first supply terminal and the control terminals of the upper write switching transistors. The PNP-type transistor bias circuit includes a resistor coupled between the first terminal and a control terminal of the first PNP-type transistor.

In another embodiment, the PNP-type transistor bias circuit includes a second PNP-type transistor electrically coupled to the first terminal and to the control terminal of the first PNP-type transistor to form a current mirror, wherein current flowing through the first PNP-type transistor is substantially equal to the current flowing through the second PNP-type transistor.

When selected, the read/write preamplifier may be operated in either write mode or read mode. During write mode, the write control switching circuit, the write control biasing circuit and the write data control circuit operate to actively control current flow through the magnetic head. During read mode or during the unselected state, the biasing circuitry connected to the upper write switching transistors turns the upper write switching transistors OFF to form high impedance connections with the head contacts and with connected read differential transistor pair. During read mode, the read differential transistor pair senses changes in magnetic polarization of adjacent bit positions on a magnetic media.

DETAILED DESCRIPTION OF THE PREFERRED EMBODIMENTS

In a magnetic storage system having a plurality of magnetic heads, each magnetic head is electrically connected to a head cell circuit. Each head cell circuit is connected in parallel with the other head cell circuits to form a read/write preamplifier. In the following discussion, the terms "read/write preamplifier" and "head cell circuit" will be used interchangeably.

Figure 1:
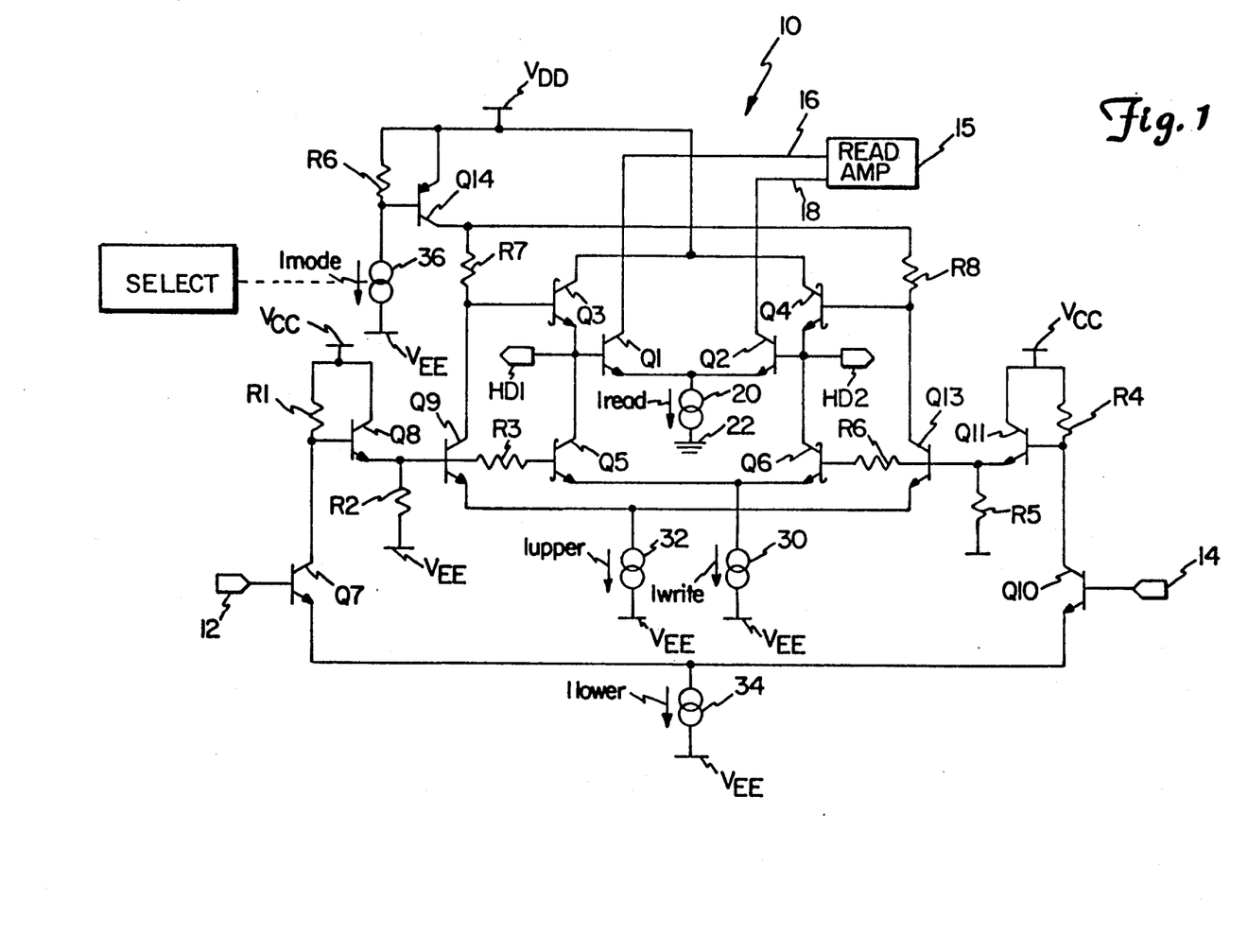
FIG. 1 is a schematic illustration of a head cell circuit of a read/write preamplifier in accordance with the present invention.

FIG. 1 schematically illustrates one embodiment of read/write preamplifier (or head cell circuit) in accordance with the present invention. A magnetic head (not shown) is connected across head contacts HD1 and HD2. The magnetic head is formed by an inductive coil. During read mode, changes in magnetic polarization of an adjacent magnetic media create a changing magnetic field that induces current flow in the inductive coil in a direction representative of the direction of polarization. The induced current flow produces differential voltages at head contacts HD1 and HD2. Read circuitry, formed by transistors Q1 and Q2 and by read current sink 20, monitors the differential voltages and produces read data output signals at the collectors 16 and 18 of transistors Q1 and Q2, respectively.

During write mode operation, preamplifier 10 writes information onto the magnetic media by forcing a relatively large current through the inductive coil in a selected direction to generate a magnetic field that polarizes bit positions on the magnetic media in directions indicative of the data being written. A write control H-switch, formed by transistors Q3, Q4, Q5 and Q6 is connected to head contacts HD1 and HD2 for controlling current direction through the inductive coil. The H-switch includes upper write switching transistors Q3 and Q4 and lower write switching transistors Q5 and Q6.

Write data control circuitry controls operation of the H-switch in response to write data signals applied to complementary write data input terminals 12 and 14. The write data control circuitry is formed by transistors Q7, Q8, Q9, Q10, Q11 and Q13, bias resistors R1, R2, R3, R4, R5, and R6, current sink 32 and current sink 34. Voltage biasing circuitry drives the upper write switching transistors (transistors Q3 and Q4) and is formed by current sink 36, PNP-type transistor Q14 and bias resistors R6, R7 and R8. The voltage biasing circuitry drives the upper write switching transistors Q3 and Q4 between selected and unselected states with minimal power, as will be discussed in greater detail below.

The read circuitry is operative only when preamplifier 10 is both selected and in read mode operation. Transistors Q1 and Q2 form a read differential transistor pair. The emitter of transistor Q1 is connected to the emitter of transmitter Q2 and to read current sink 20. The base of transistor Q1 is connected to head contact HD1. The collector 16 of transistor Q1 is connected to read amplifier 15. Similarly, the base of transistor Q2 is connected to head contact HD2. The collector 18 of transistor Q2 is connected to read amplifier 15.

Read current sink 20 is electrically connected between the read differential transistor pair and ground terminal 22. During read mode operation, read current sink 20 sinks read current that is directed through transistors Q1 and Q2. The differential voltage between head contacts HD1 and HD2 controls the distribution of read current $I_{read}$ between transistors Q1 and Q2. The collector currents of transistors Q1 and Q2 are indicative of the direction of current flow induced in the magnetic head by the magnetic media. Differential read data output signals, formed by the collector currents of transistors Q1 and Q2, are therefore indicative of the information stored o the magnetic media. Differential read data output signals are applied to read amplifier 15.

The write control H-switch is connected between a relatively positive voltage supply rail $V_{DD}$ and current sink 30. The H-switch includes upper write switching transistors Q3 and Q4 and lower write switching transistors Q5 and Q6. The collectors of transistors Q3 and Q4 are connected together at voltage supply rail $V_{dd}$. The emitter of transistor Q3 is connected to head contact HD1, the base of transistor Q1 and the collector of transistor Q5. The emitter of transistor Q4 is connected to head contact HD2, the base of transistor Q2 and the collector of transistor Q6. The emitters of transistors Q5 and Q6 are connected together at write current sink 30.

Write current sink 30 is connected between the emitters of transistors Q5 and Q6 and a relatively negative voltage supply rail $V_{EE}$. Write current sink 30 sinks a write current $I_{Write}$ that is directed through the magnetic head in either a first direction or in a second direction. In the first direction, write current $I_{Write}$ is directed from voltage supply rail $V_{DD}$ through transistor Q3, head contact HD1, the connected magnetic head (not shown), head contact HD2 and transistor Q6. In the second direction, write current $I_{Write}$ is directed from voltage supply rail $V_{DD}$ through transistor Q4, head contact HD2, the magnetic head, head contact HD1 and transistor Q5.

Complementary write data input terminals 12 and 14 are connected to the base terminals of transistors Q7 and Q10, respectively. The emitters of transistors Q7 and Q10 are connected together at current sink 34. Transistors Q7 and Q10 are connected as a differential transistor pair that is responsive to write data signals applied to input terminals 12 and 14. Current sink 34 is connected between the emitters of transistors Q7 and Q10 and voltage supply rail $V_{EE}$. Current sink 34 sinks a current $I_{lower}$ from the bias circuitry of the lower write switching transistors Q5 and Q6.

Transistor Q8 supplies base current to transistors Q5 and Q9. The base of transistor Q8 is connected to the collector of transistor Q7 and to a first terminal of bias resistor R1. The collector of transistor Q8 is connected to a second terminal of bias resistor R1 and to supply rail $V_{cc}$. The emitter of transistor Q8 is connected to the base of transistor Q9, a first terminal of bias resistor R2 and a first terminal of bias resistor R3. A second terminal of bias resistor R2 is connected to supply rail $V_{EE}$. A second terminal of bias resistor R3 is connected to the base of transistor Q5. The collector of transistor Q9 is connected to a first terminal of bias resistor R7 and to the base of transistor Q3.

Similarly, transistor Q11 supplies base current to transistors Q6 and Q13. The base of transistor Q11 is connected to the collector of transistor Q10 and to a first terminal of bias resistor R4. The collector of transistor Q11 is connected to a second terminal of bias resistor R4 and to supply rail $V_{cc}$. The emitter of transistor Q11 is connected to the base of transistor Q13, a first terminal of bias resistor R5 and a first terminal of bias resistor R6. A second terminal of bias resistor R5 is connected to supply rail $V_{EE}$. A second terminal of bias resistor R6 is connected to the base of transistor Q6. The collector of transistor Q13 is connected to a first terminal of bias resistor R8 and to the base of transistor Q4.

Current sink 32 is connected between the emitters of transistors Q9 and Q13 and supply terminal $V_{EE}$. Current sink 32 sinks a current $I_{upper}$ from the bias circuitry of the upper write switching transistors Q3 and Q4. Transistors Q9 and Q13 are connected to form a differential transistor pair that controls the base voltages of transistors Q3 and Q4 as a function of the write data signals applied to input terminals 12 and 14.

Read/write preamplifier 10 may be operated in either read mode or in write mode. Further, only one magnetic head and head cell circuit are selected at a given time. Current sinks 20, 30, 32, 34 and 36 are therefore switched between active and inactive states by selection circuitry 37, such as that discussed with reference to FIG. 2. During read mode operation, the read circuitry is operative with read current sink 20 active and write current sinks 30, 32, 34 and 36 inactive.

During write mode operation, the write data circuitry is operative with write current sinks 30, 32, 34 and 36 active and read current sink 20 inactive. Write data signals are applied to complementary write data input terminals 12 and 14 to switch transistors Q7 and Q10 between ON and OFF states. For example, when terminal 12 is LOW and terminal 14 is HIGH, transistor Q7 turns OFF and transistor Q1 turns ON. When transistor Q7 is OFF, bias resistor R1 pulls the base of transistor Q8 HIGH toward supply rail $V_{cc}$. Transistor Q8 turns ON and supplies base current to transistors Q9 and Q5. Transistors Q9 and Q5 turn ON. Transistor Q9 pulls the base of transistor Q3 LOW toward supply rail $V_{EE}$ to turn OFF transistor Q3.

The HIGH state at input terminal 14 turns transistor Q10 ON which pulls the base of transistor Q11 LOW toward supply rail $V_{EE}$, thereby turning transistor Q11 OFF. The bases of transistors Q13 and Q6 are pulled LOW through bias resistors R5 and R6 toward supply rail $V_{EE}$ to turn OFF transistors Q13 and Q6. With transistor Q13 OFF, the base of transistor Q4 is pulled HIGH toward supply rail $V_{DD}$ through the voltage biasing circuitry of the upper write switching transistors. Therefore, with input terminal 12 LOW and input terminal 14 HIGH, H-switch transistors Q4 and Q5 turn ON while transistors Q3 and Q6 turn OFF. In this situation, write current $I_{Write}$ is directed through transistor Q4, head contact HD2, the connected magnetic head, head contact HD1, and transistor Q5.

Write current $I_{Write}$, flowing through the magnetic head, may be reversed by complementing the write data signals applied to terminals 12 and 14. With input terminal 12 HIGH and input terminal 14 LOW, transistors Q4 and Q5 turn OFF while transistors Q3 and Q6 turn ON in a manner similar to that discussed above. Write current $I_{Write}$ is directed through transistor Q3, head contact HD1, the connected magnetic head, head contact HD2 and transistor Q6.

The voltage biasing circuitry for the upper write switching transistors drives the base terminals of transistors Q3 and Q4. The voltage biasing circuitry includes mode-controlled current sink 36, PNP-type transistor Q14 and bias resistors R6, R7 and R8. Mode-controlled current sink 36 is connected between supply rail $V_{EE}$ and the base of PNP-type transistor Q14. Current sink 36 is also connected to a first terminal of bias resistor R6. A second terminal of bias resistor R6 is connected to supply rail $V_{DD}$ and to the emitter of transistor Q14. The collector of transistor Q14 is connected to second terminals of bias resistors R7 and R8. The first terminal of bias resistor R7 is connected to the base of transistor Q3 and to the collector of transistor Q9. The first terminal of bias resistor R8 is connected to the base of transistor Q4 and to the collector of transistor Q13.

Mode-controlled current sink 36 sinks a current $I_{Mode}$ when preamplifier 10 is in the selected state and in write mode operation. Mode-controlled current sink 36 is inactive when preamplifier 10 is in either the unselected state or in read mode operation. When mode-controlled current sink 36 is active, the base of transistor Q14 is pulled LOW to turn ON PNP-type transistor Q14. Q14 drives the base currents of transistors Q3 and Q4 through bias resistors R7 and R8.

When preamplifier 10 is in either the unselected state or in the read mode, the H-switch is powered down to isolate the H-switch from head contacts HD1 and HD2 to prevent information from being written through an unselected head or to prevent the H-switch from corrupting the read data signals at head contacts HD1 and HD2. This is particularly important because the differential voltages generated during read mode operation are relatively small compared to the differential voltages created during write mode operation by the H-switch. For example, the differential voltages created during read mode operation may be about 1.0 millivolts, while the differential voltages created during write mode operation may be as large as 7.0 volts.

The H-switch is isolated from the head contacts HD1 and HD2 by creating HIGH impedance connections between the H-switch and the head contacts. Write current $I_{Write}$ is removed by switching write current sink 30 into the inactive state. This prevents current interference through lower write switching transistors Q5 and Q6. However, the upper H-switch transistors Q3 and Q4 must also be isolated from head contacts HD1 and HD2. This is accomplished by removing the drive to transistors Q3 and Q4 with the voltage biasing circuitry to turn OFF transistors Q3 and Q4. Mode-controlled current sink 36 is switched to the inactive state causing the base of PNP-type transistor Q14 to be pulled HIGH through bias resistor R6 toward supply rail $V_{DD}$. Transistor Q14 turns OFF, removing base current from upper write switching transistors Q3 and Q4 and creating HIGH impedance connections with head contacts HD1 and HD2.

By using a PNP-type transistor to drive the base currents of upper write switching transistors Q3 and Q4, transistors Q3 and Q4 may be isolated from head contacts HD1 and HD2 by switching mode-controlled current source 36 into the inactive state. Therefore, minimal power is dissipated in the unselected head cell circuits, as opposed to circuits of the prior art which wasted considerable power while isolating upper write switching transistors in unselected heads. The present invention provides for considerable power savings in large magnetic storage systems with H-switch type write control circuitry.

Figure 2:
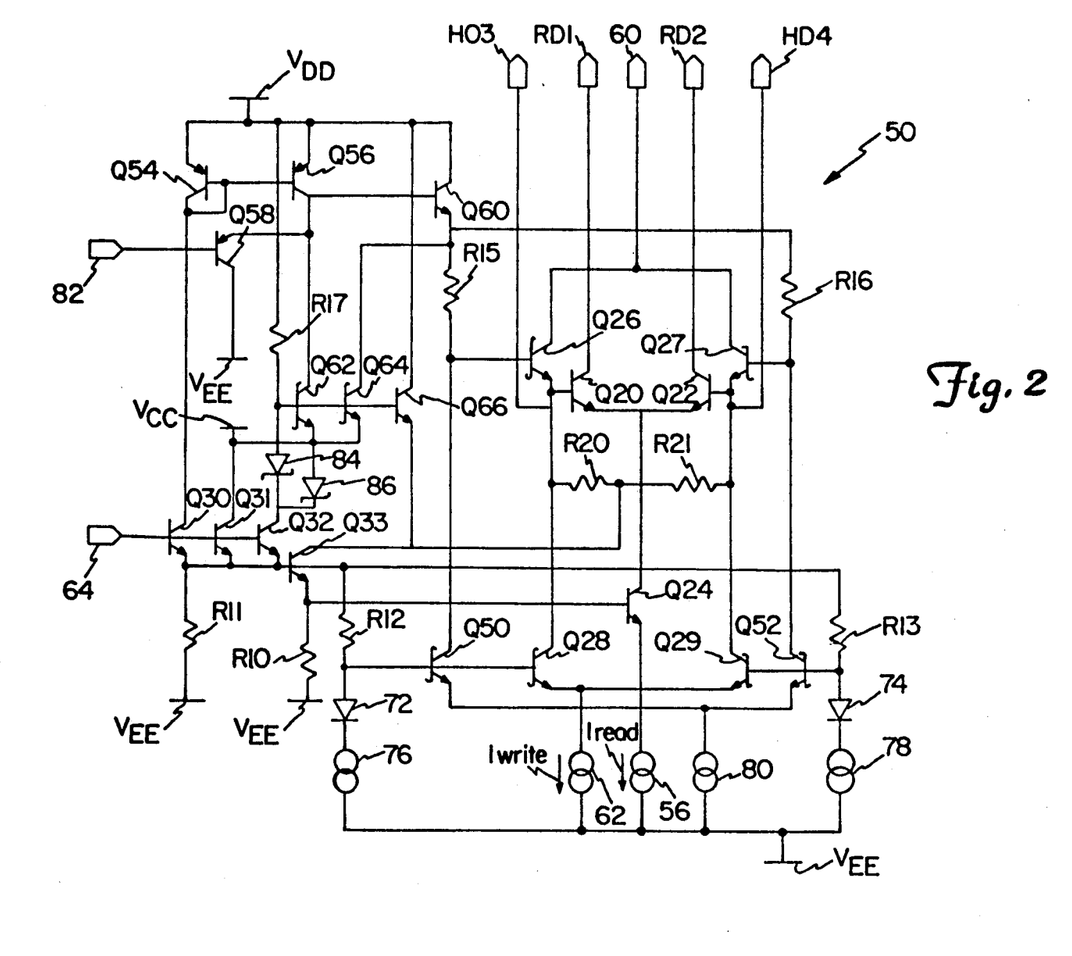
FIG. 2 is a schematic illustration of an alternative read/write preamplifier configuration in accordance with the present invention.

Alternative embodiments of the present invention may include several circuit configurations with biasing circuitry electrically connected between PNP-type transistor Q14 and the upper write switching transistors Q3 and Q4, provided PNP-type transistor Q14 effectively controls the base current and base voltage of the upper write switching transistors. For example, FIG. 2 schematically illustrates a alternative embodiment of a read/write preamplifier in accordance with the present invention.

Read/write preamplifier 50 includes read circuitry formed by read differential transistor pair Q20 and Q22 and read current select transistor Q24. Read differential transistor pair Q20 and Q22 is connected between read data output terminals RD1 and RD2 and read current select transistor Q24. The base terminals of transistors Q20 and Q22 are connected to head contacts HD3 and HD4, respectively. A magnetic head (not shown) is connected between head contacts HD3 and HD4. Current flow through the collectors of transistors Q20 and Q22 is representative of the current induced in the connected magnetic head. The collectors of transistors Q20 and Q22 generate read data signals at read data output terminals RD1 and RD2. The emitter of read current select transistor Q24 is connected to read current sink 56. Read current sink 56 sinks read current $I_{Read}$. Read current select transistor Q24 conducts read current $I_{Read}$ when preamplifier 50 is in both the selected state and read mode, and prevents conduction of read current $I_{Read}$ when preamplifier 50 is in either the unselected state or in write mode.

Similar to the embodiment shown in FIG. 1, preamplifier 50 includes write circuitry having an H-switch for controlling the direction at which current flows through the connected magnetic head during write mode. The H-switch includes transistors Q26, Q27, Q28 and Q29. Transistors Q26 and Q27 form upper write switching transistors which are connected to head contacts HD3 and HD4 at the emitters of transistors Q26 and Q27, respectively. The collectors of transistors Q26 and Q27 ar connected together at input terminal 60.

Transistors Q28 and Q29 form lower write switching transistors which are connected to head contacts HD3 and HD4 at the collectors of transistors Q28 and Q29, respectively. The emitters of transistors Q28 and Q29 are connected together at a write current sink 62. Write current sink 62 sinks a write current $I_{write}$ from the H-switch. H-switch transistors Q26, Q27, Q28 ad Q29 are switched between ON and OFF states to direct current in either a first direction or in a second direction through the connected magnetic head.

Read/write preamplifier 50 is driven between selected and unselected states by head select signals applied to head select terminal 64. In the selected mode, terminal 64 is HIGH causing transistors Q30, Q31 and Q32 to turn ON and drive both the read circuitry and the write circuitry. The emitters of transistors Q30, Q31 and Q32 are connected to the base of transistor Q33 and to a first terminal of bias resistor R11. When transistors Q30, Q31 and Q32 are ON, transistor Q33 turns ON and supplies base current to read current select transistor Q24, causing it to turn ON. Therefore, read current sink 56 sinks current from the read differential transistor pair Q20 and Q22 when read/write preamplifier circuit 50 is in the selected mode. However, read current sink 56 is only active when read/write preamplifier 50 is in the read mode and write control current sinks 76, 78 and 80 are inactive. When transistors Q30, Q31, Q32 and Q33 are OFF, the base of transistor Q24 is pulled low through bias resistor R10 to turn OFF transistor Q24.

Similarly, transistors Q30, Q31 and Q32 drive the write data control circuitry formed by transistors Q50 and Q52, diodes 72 and 74 and bias resistors R11, R12 and R13 During write mode, current sink 80 is active. Write control current sinks 76 and 78 switch between active and inactive states to control operation of the H-switch transistors Q26, Q27, Q28 and Q29. Write current sink 80 sinks current from the voltage biasing circuitry. Current sinks 76 and 78 are not active at the same time. For example, if current sink 6 is active and current sink 78 is inactive, current sinks 62 and 80 are active, transistors Q50 and Q28 turn OFF and transistors Q29 and Q52 turn ON. The base of transistor Q26 is pulled HIGH by bias resistor R15 and transistor Q60 to turn ON transistor Q26. Transistor Q52 pulls the base of transistor Q27 LOW to turn OFF transistor Q27. Therefore, write current $I_{Write}$ flows through transistor Q26, head contact HD3, the connected magnetic head, head contact HD4 and transistor Q29.

When current sink 76 is inactive and current sink 78 is active, H-switch transistors Q26 and Q29 turn OFF and H-switch transistors Q27 and Q28 turn ON. In this situation, write current $I_{Write}$ flows through transistor Q27, head contact HD4, the connected magnetic head, head contact HD3 and transistor Q28.

Read/write preamplifier 50 further includes upper H-switch voltage biasing circuitry that controls the base current and base voltage of upper write switching transistors Q26 and Q27. The upper H-switch biasing circuitry includes PNP-type transistors Q54, Q56 and Q58, NPN-type transistors Q60, Q62 and Q64 and bias resistors R15 and R16. When read/write preamplifier 50 is in the selected state and in write mode, either write control sink 76 or 78 will be active and head select terminal 64 will be HIGH causing transistor Q30 to turn ON and to conduct current through either current sink 76 or 78.

PNP-type transistors Q54 and Q56 form a current mirror in which the current flowing into the emitter of transistor Q56 is equivalent to the current flowing into the emitter of transistor Q54, as controlled by transistor Q30. Transistor Q56 supplies base current to transistor Q60 to turn ON transistor Q60. Transistor Q60 conducts current and drives the base terminals of upper write switching transistors Q26 and Q27 through bias resistors R15 and R16. Therefore, when read/write preamplifier 50 is in the selected state and in write mode, PNP-type transistor Q56 activates the upper write switching transistors Q26 and Q27.

When read/write preamplifier 50 is in the unselected state or in read mode, PNP-type transistor Q56 powers down upper write switching transistors Q26 and Q27 to effectively disconnect transistors Q26 and Q27 from head contacts HD3 and HD4. In the unselected state, head select terminal 64 is low and write current sinks 62, 76, 78 and 80 are used by a selected preamplifier head cell circuit which is connected in parallel with preamplifier 50. In read mode, write control current sinks 76 and 78 are inactive and therefore do not sink current flowing through transistor Q30. In either case, the current flowing through transistor Q30 will not be sufficient to forward bias transistors Q54 and Q56. As a result, transistors Q56, Q60, Q26 and Q27 turn OFF, thereby creating high impedance connections between upper write switching transistors Q26 and Q27 and head contacts HD3 and HD4.

Read/write preamplifier 50 further includes voltage clamping circuitry formed by voltage input terminal 82 and PNP-type transistor Q58. Voltage input terminal 82 is connected to a reference voltage source (not shown) that supplies reference voltage $V_{ref}$ at the base of PNP-type transistor Q58. PNP-type transistor Q58 clamps the collector of transistor Q58 and the base of transistor Q60 at approximately one "diode drop" above reference voltage $V_{ref}$. If the collector of transistor Q56 rises to a voltage equal to one diode drop above reference voltage $V_{ref}$, transistor Q58 turns ON and clamps the collector voltage of transistor Q56.

During the unselected state or during read mode, the collector of PNP-type transistor Q56 forms a high impedance connection with the base of transistor Q60. When the base of transistor Q60 is at a high impedance state, transistor Q60 turns OFF slowly. Because switching speed is critical to disk drive performance, read/write preamplifier 50 further includes pull-down circuitry formed by transistor Q62, bias resistor R17 and diodes 84 and 86. During the unselected state or read mode, a very small amount of current flows through bias resistor R17 and into the bases of transistors Q62 and Q64. The current flowing through bias resistor R17 is sufficient enough to turn ON transistors Q62 and Q64. Transistor Q62 pulls the base of transistor Q60 low to eliminate the high impedance connection at the base of transistor Q60. Similarly, transistor Q64 pulls the bases of transistors Q26 and Q27 LOW to eliminate high impedance conditions at the bases of transistors Q26 and Q27.

The pull-down circuitry is deactivated when read/write preamplifier 50 is in the selected state and in write mode. In this situation, transistor Q32 turns ON hard and pulls the base terminals of transistors Q62 and Q64 low to turn OFF transistors Q62 and Q64. Transistors Q62 and Q64 are therefore effectively disconnected from the rest of the circuit.

Read/write preamplifier 50 further includes circuitry that biases the voltage level at head contacts HD3 and HD4 during read mode. Resistors R20 and R21 are connected in series between head contacts HD3 and HD4. Transistor Q66 is connected to a junction between resistors R20 and R21 to provide a voltage bias level at the junction. The voltage bias level is approximately $V_{cc}$.

In conclusion, the present invention provides a read/write preamplifier which is capable of powering down the upper write switching transistors with a minimal amount of power. A variety of H-switch circuit configurations may be used in accordance with the present invention, as long as the upper write switching transistors are effectively driven by a PNP-type transistor (transistor Q14 in FIG. 1 and transistor Q56 in FIG. 3). The PNP-type transistor allows the upper write switching transistors to be disconnected from the head contacts, independent from the lower write switching transistors. The read/write preamplifier of the present invention does not require a large current to power down the upper H-switch bias circuitry as do circuits shown in the prior art. As a result, the read/write preamplifier of the present invention provides considerable power savings in magnetic storage systems having a plurality of magnetic read/write heads.

Although the present invention has been described with reference to preferred embodiments, workers skilled in the art will recognize that changes may be made in form and detail without departing from the spirit and scope of the invention.

What is claimed is:

1. A read/write preamplifier configured for interconnection with a magnetic head through head contacts, the preamplifier comprising:

a write control switching circuit electrically connected between first and second supply terminals and connected to the head contacts for controlling a first current capable of flowing through the magnetic head in response to a write input signal, the switching circuit including at least one transistor;

a first transistor coupled between the first supply terminal and the at least one transistor of the write control switching circuit for controlling a second current capable of flowing to the write control switching circuit so as to cause the switching circuit to be driven to either a selected state or an unselected state with the second current and the first current having substantially different magnitudes; and a bias circuit coupled between the first and second supply terminals and to the first transistor, the bias circuit including a mode-controlled current sink responsive to a mode control signal and causing the first transistor to conduct current and drive ht switching circuit to the selected state when the mode-controlled current sink is active, and causing the first transistor to prohibit current flow and drive the switching circuit to the unselected state when the current sink is inactive.

2. A read/write preamplifier of claim 1 wherein the first transistor is a PNP-type transistor having an emitter terminal, a collector terminal and a base terminal and wherein the first supply terminal is electrically coupled to the emitter terminal of the first transistor.

3. A read/write preamplifier of claim 2 wherein the bias circuit is electrically coupled to the base and emitter terminals of the first transistor and in series with the first supply terminal and the mode-controlled current sink.

4. A read/write preamplifier of claim 3 wherein the bias circuit includes a resistor coupled between the emitter and base terminals of the first transistor.

5. A read/write preamplifier of claim 3 wherein the bias circuit includes a second PNP-type transistor electrically coupled to the emitter and base terminals of the first transistor to form a current mirror wherein the second current flowing through the first transistor is related to a mirror current flowing through the second PNP-type transistor.

6. A read/write preamplifier of claim 1 wherein the write control switching circuit further includes an H-switch comprising:

upper write switching transistors, each transistor having first and second terminals connected in series with the first supply terminal and the head contacts and having a control terminal electrically connected to receive current from the first transistor with the first transistor being a PNP-type transistor;

lower write switching transistors, each transistor having first and second terminals connected in series with the head contacts and the second supply terminal and having a control terminal; and write data control circuitry electrically connected to the control terminals of the upper and lower write switching transistors for operating the upper and lower write switching transistors to control the direction at which the first current flows through the magnetic head.

7. The read/write preamplifier of claim 6 wherein the first supply terminal operates as a voltage source for the control terminals of the upper write switching transistors.

8. The read/write preamplifier of claim 6 wherein the second supply terminal operates as a current sink for the second terminals of the lower write switching transistors.

9. The read/write preamplifier of claim 6 and further comprising:

a read amplifier;

a read current sink; and a read differential transistor pair, each transistor int he pair having first and second terminals connected in series between the read amplifier and the read current sink and having a control terminal connected to the head contacts.

10. The read/write preamplifier of claim 9 wherein the second terminals of the upper write switching transistors, int he unselected state, have a high impedance connections with the head contacts and with the control terminals of the read differential transistor pair.

11. The read/write preamplifier of claim 6 and further comprising voltage biasing circuitry electrically connected between the control terminals of the upper write switching transistors and the first transistor.

12. The read/write preamplifier of claim 11 wherein the voltage biasing circuitry includes at least one resistor connected between the first transistor and the control terminals of the upper write switching transistors.

13. The read/write preamplifier of claim 11 wherein the voltage biasing circuitry includes an NPN-type transistor having a control terminal electrically coupled to the collector terminal of the first transistor and an emitter terminal electrically coupled to the control terminals of the upper write switching transistors in such a manner as to create an emitter-follower connection between the NPN-type transistor and the control terminals of the upper write switching transistors.

14. A read/write preamplifier configured for interconnection with a magnetic head through head contacts, the preamplifier comprising:

upper write switching transistors, each transistor having a first terminal, a second terminal, and a control terminal, wherein the first and second terminals are connected in series with a first supply terminal and the head contacts;

lower write switching transistors, each transistor having a first terminal, a second terminal, and a control terminal, wherein the first and second terminals are connected in series with the head contacts and second supply terminal;

a first PNP-type transistor including a base terminal, a collector terminal and an emitter terminal, wherein the emitter terminal is electrically connected to the first supply terminal and the collector terminal is electrically connected to the upper write switching transistors such that the collector terminal controls current flow into the control terminals of the upper write switching transistors so as to cause the upper write switching transistors to be driven to either a selected state or an unselected state;

a bias circuit coupled between the first and second supply terminals and to the emitter and base terminals of the first PNP-type transistor, the bias circuit including a mode-controlled current sink responsive to a mode control signal and causing the first PNP-type transistor to conduct current and drive the upper write switching transistors to the selected state when the mode-controlled current sink is active, and causing the first PNP-type transistor to prohibit current flow and drive the upper write switching transistors to the unselected state when the mode-controlled current sink is inactive; and write data control circuitry electrically connected to the control terminals of the upper and lower write switching transistors to control current flow through the magnetic head in response to a write input signal.

15. The read/write preamplifier of claim 14 wherein the bias circuit includes a resistor coupled between the emitter and base terminals of the first PNP-type transistor and in series with the first supply terminal and the mode-controlled current sink.

16. The read/write preamplifier of claim 14 wherein the bias circuit includes a second PNP-type transistor electrically coupled to the emitter and base terminals of the first PNP-type transistor in such a manner as to form a current mirror wherein current flowing through the first PNP-type transistor is related to a current flowing through the second PNP-type transistor.

17. The read/write preamplifier of claim 14 wherein the first supply terminal operates as a voltage source for the control terminals of the upper write switching transistors.

18. The read/write preamplifier of claim 14 wherein the second supply terminal operates as a current sink for the second terminals of the lower write switching transistors.

19. The read/write preamplifier of claim 14 and further comprising:
 a read amplifier;
 a read current sink; and
 a read differential transistor pair, each transistor in the pair having first and second terminals connected in series between the read amplifier and the read current sink and having a control terminal connected to the head contacts.

20. The read/write preamplifier of claim 19 wherein the second terminals of the upper write switching transistors, in the unselected state, have a high impedance connections with the head contacts and with the control terminals of the read differential transistor pair.

21. The read/write preamplifier of claim 14 wherein the control terminals of the upper write switching transistors are electrically connected to the receive current from the first PNP-type transistor through voltage biasing circuitry.

22. The read/write preamplifier of claim 21 wherein the voltage biasing circuitry includes at least one resistor connected between the collector terminal of the first PNP-type transistor and the control terminals of the upper write switching transistors.

23. The read/write preamplifier of claim 21 wherein the voltage biasing circuitry includes an NPN-type transistor having a control terminal electrically coupled to the collector terminal of the first PNP-type transistor, and an emitter terminal electrically coupled to the control terminals of the upper write switching transistors in such a manner as to create an emitter-follower connection between the NPN-type transistor and the control terminals of the upper write switching transistors.

24. An improved read/write preamplifier of the type having a read differential transistor pair and an H-switch write control circuit with upper write switching transistors, lower write switching transistors and first and second supply terminals, the read differential transistor pair and the upper and lower write switching transistors electrically connected to a read/write magnetic head, the improvement comprising;
 a first PNP-type transistor having a collector terminal, an emitter terminal and a base terminal, the collector terminal electrically coupled to the upper write switching transistors for controlling base current into each of the upper write switching transistors so as to cause the upper write switching transistors to be driven to either a selected state or an unselected state, the emitter terminal electrically coupled to the first supply terminal; and
 a bias circuit coupled between the first and second supply terminals and to the emitter and base terminals of the first PNP-type transistor and including a mode controlled current sink responsive to a mode control signal, the bias circuit causing the first PNP-type transistor to conduct current and drive the upper write switching transistors to the selected state when the mode-controlled current sink is active, and causing the first PNP-type transistor to prohibit current flow and drive the upper write switching transistors to the unselected state when the mode-controlled current sink is inactive.

25. The read/write preamplifier of claim 24 wherein the bias circuit includes a resistor coupled between the emitter and base terminals of the first PNP-type transistor and in series with the first supply terminal and the mode-controlled current sink.

26. The read/write preamplifier of claim 24 wherein the bias circuit includes a second PNP-type transistor electrically coupled to the emitter and base terminals of the first PNP-type transistor in such a manner as to form a current mirror wherein current flowing through the first PNP-type transistor is related to the current flowing through the second PNP-type transistor.

27. The read/write preamplifier of claim 24 wherein the upper write switching transistors, in the unselected state, have a high impedance connections with the head contacts and with the read differential transistor pair.

28. The read/write preamplifier of claim 24 wherein the upper write switching transistors include control terminals that are electrically connected to receive current from the collector terminal of the first PNP-type transistor through voltage biasing circuitry.

29. The read/write preamplifier of claim 28 wherein the voltage biasing circuitry includes at least one resistor.

30. The read/write preamplifier of claim 28 wherein the voltage biasing circuitry includes an NPN-type transistor having a control terminal electrically coupled to the collector terminal of the first PNP-type transistor and an emitter terminal electrically coupled to the control terminals of the upper write switching transistors in such a manner as to create emitter-follower connections between the NPN-type transistor and the control terminals of the upper write switching transistors.

* * * * *

UNITED STATES PATENT AND TRADEMARK OFFICE
CERTIFICATE OF CORRECTION

PATENT NO. : 5,132,852
DATED : July 21, 1992
INVENTOR(S) : JOHN J. PRICE, JR.

It is certified that error appears in the above-identified patent and that said Letters Patent is hereby corrected as shown below:

Col. 11, line 27, delete "ht", insert "the"

Col. 11, lines 33, 38, 43, 46, and 53, delete "A", insert "The"

Col. 12, line 18, delete "he", insert "the"

Col. 12, line 24, delete "int he", insert "in the"

Col. 12, line 17, delete "int", insert "in"

Signed and Sealed this

Thirty-first Day of August, 1993

*Attest:*

BRUCE LEHMAN

*Attesting Officer*        *Commissioner of Patents and Trademarks*